(12) United States Patent
Gathings et al.

(10) Patent No.: US 12,130,131 B1
(45) Date of Patent: Oct. 29, 2024

(54) METHOD AND APPARATUS FOR FITTING PIPE

(71) Applicants: Robert Gathings, Bloomfield, NM (US); Michael Gathings, Bloomfield, NM (US)

(72) Inventors: Robert Gathings, Bloomfield, NM (US); Michael Gathings, Bloomfield, NM (US)

( * ) Notice: Subject to any disclaimer, the term of this patent is extended or adjusted under 35 U.S.C. 154(b) by 174 days.

(21) Appl. No.: 17/871,773

(22) Filed: Jul. 22, 2022

Related U.S. Application Data (60) Provisional application No. 63/225,320, filed on Jul. 23, 2021.

(51) Int. Cl.
*G01B 5/02* (2006.01)
*G01B 5/24* (2006.01)

(52) U.S. Cl.
CPC .................. *G01B 5/02* (2013.01); *G01B 5/24* (2013.01)

(58) Field of Classification Search
CPC .................. G01B 5/02; G01B 5/24
See application file for complete search history.

(56) References Cited

U.S. PATENT DOCUMENTS

| | | | |
|---|---|---|---|
| 3,967,324 A | 7/1976 | Olive | |
| 4,593,476 A * | 6/1986 | Clark | G01B 5/207 33/529 |
| 4,639,016 A * | 1/1987 | Rogers | F16L 55/1608 285/31 |
| 6,196,272 B1 * | 3/2001 | Davis | F16L 59/14 138/137 |
| 6,741,899 B1 * | 5/2004 | Wu | G06F 30/00 72/369 |
| 7,603,853 B1 * | 10/2009 | Franco | F01N 13/1844 166/85.1 |
| 7,685,734 B1 * | 3/2010 | Burger | B25H 7/005 33/1 G |
| 8,061,053 B2 * | 11/2011 | Gillan | G01B 5/12 33/544.4 |
| 8,752,865 B1 * | 6/2014 | Coogle | F24F 13/222 137/271 |

(Continued)

FOREIGN PATENT DOCUMENTS

| | | |
|---|---|---|
| CN | 102853194 A | 1/2013 |
| CN | 203214016 U | 9/2013 |

(Continued)

OTHER PUBLICATIONS

"Installation of (spiral) tubes and assembly tips", https://www.ventilationland.co.uk/i/installation-spiral-tubes-assembly-tips.html, downloaded Jun. 10, 2022, published Oct. 23, 2021.

*Primary Examiner* — Yaritza Guadalupe-McCall
(74) *Attorney, Agent, or Firm* — Justin R. Jackson; Peacock Law P.C.

(57) ABSTRACT

A method and apparatus for fitting pipe by creating a mock layout from a parts kit that can include adjustable components. Once the mock layout has been constructed and positioned as desired, a user can take precise measurements of the mock layout to construct the pipe weldment based on the lengths and angles of the mock layout, thus enabling a pipe fitter to construct a weldment to replace the mock layout with, thereby more easily constructing a weldment to fit within a desired location and orientation. The parts kit can include components having adjustable lengths and a plurality of adjustable and/or selectable angle portions.

18 Claims, 7 Drawing Sheets

(56) References Cited

U.S. PATENT DOCUMENTS

| | | | | |
|---|---|---|---|---|
| 8,763,645 B2* | 7/2014 | Hendershot | ............ | F16L 3/1075 |
| | | | | 248/62 |
| 9,611,960 B2* | 4/2017 | Swingley | ............... | F16L 23/006 |
| 10,071,474 B2* | 9/2018 | Nagano | ................. | B25H 7/005 |
| 10,452,811 B2* | 10/2019 | Rouyre | ................ | G06T 17/005 |
| 10,458,575 B2* | 10/2019 | Argersinger | ........... | F16L 11/115 |
| 10,822,780 B2 | 11/2020 | Sumner et al. | | |
| 11,614,326 B2* | 3/2023 | Drewett | ................... | G01C 9/08 |
| | | | | 33/333 |
| 2008/0148477 A1 | 6/2008 | Shafik | | |
| 2010/0122451 A1* | 5/2010 | Yang | ...................... | G06F 30/20 |
| | | | | 29/241 |
| 2013/0174931 A1* | 7/2013 | Hendershot | ........... | F16L 3/1075 |
| | | | | 248/59 |
| 2014/0163929 A1* | 6/2014 | Richter | ................... | G06F 30/00 |
| | | | | 703/1 |
| 2015/0285607 A1* | 10/2015 | Helmore | .................. | G01B 5/12 |
| | | | | 33/558.2 |
| 2015/0354729 A1* | 12/2015 | Hendershot | ............... | F16L 3/00 |
| | | | | 29/468 |
| 2018/0023730 A1* | 1/2018 | Argersinger | ............ | F16L 11/12 |
| | | | | 285/179 |
| 2020/0250358 A1* | 8/2020 | McGrath | ............. | G06Q 50/04 |
| 2021/0190494 A1* | 6/2021 | Lindberg | ............ | G01C 15/004 |
| 2022/0170577 A1 | 6/2022 | Rusconi | | |

FOREIGN PATENT DOCUMENTS

| | | | | |
|---|---|---|---|---|
| CN | 208735093 U | | 4/2019 | |
| GB | 2524904 A | * | 10/2015 | ............ E21B 47/00 |

\* cited by examiner

METHOD AND APPARATUS FOR FITTING PIPE

CROSS-REFERENCE TO RELATED APPLICATIONS

This application claims priority to and the benefit of the filing of U.S. Provisional Patent Application No. 63/225,320, entitled "Field Fitter", filed on Jul. 23, 2021, and the specification thereof is incorporated herein by reference.

BACKGROUND OF THE INVENTION

Embodiments of the present invention relate to a method and apparatus for precisely fitting pipe. More particularly, embodiments of the present invention relate to a kit of components that can be connected together in a custom manner to form an assembly that precisely matches the lengths and angles of pipes and fittings that are needed to build a pipe connection.

When a pipe fitter is attempting to build a pipe fitting assembly to fit into or onto a particular piece of equipment or other structure, the user must construct the pipe assembly to very precise dimensions. This is especially true when dealing with welded pipe connections for pipes that have a relatively large diameter and thus not able to easily be elastically deformed by pushing them into position. So, while a long run of 1" pipe can be pushed and pulled somewhat to cheat it into a precise position, a short run of 6" steel pipe must be constructed to even tighter tolerances.

Some pipe connections require a pipe fitter to weld various angled pipe fittings and pipe segments together into a convoluted configuration that must weave around other pipes and components to precisely connect to attachment locations at each end. It can be extremely difficult to fabricate this to precise dimensions when using a floppy tape measure.

Embodiments of the present invention also relate to a mock pipe run kit which provides an array of components that can be coupled to quickly and easily create a mock pipe run. The mock pipe run kit is occasionally referred to as a "field fitter" throughout this application.

There is thus a present need for a method and apparatus that enables a user to quickly and easily lay out a run of pipe and connections in a precise manner.

BRIEF SUMMARY OF EMBODIMENTS OF THE PRESENT INVENTION

Embodiments of the present invention relate to a method for fitting pipe, the method including constructing a mock run of pipe by connecting a plurality of components together from a desired starting location for a pipe run to a desired ending location, taking measurements of the constructed mock run of pipe, constructing a pipe run based on the taken measurements, and replacing the mock run of pipe with the constructed pipe run. In one embodiment, mock run of pipe can include selecting the plurality of components from a kit and/or connecting at least one angle component to at least one straight component. Connecting at least one angle component to at least one straight component can include adjusting a length of the straight component.

In one embodiment, constructing a pipe run can include cutting a pipe to a desired length and/or welding at least a portion of the pipe run, and welding can include at least one angled pipe fitting to at least one pipe. The method can include one or more of: disposing a plug within a desired starting and/or ending location of the mock run of pipe, inserting a male end of a first component into a female end of a second component, screwing a first component onto a second component, inserting a straight component into an angled component and securing the straight component to the angled component by passing a threaded fastener through at least a portion of the angled component, and screwing the threaded fastener into an end portion of the straight component, and/or positioning the mock run of pipe into a desired configuration such that the mock run of pipe extends from a first end to a second end in an orientation that is desired of the constructed pipe run.

Embodiments of the present invention also relate to a mock pipe run kit that includes a plurality of straight components, each of the plurality of straight components having at least one male end; a plurality of angle components, each of the plurality of angle components having at least one female end, wherein the at least one male end is configured to couple to the at least one female end; and a first plug, the first plug having a first end which is configured to secure within an end of a pipe or an end of a pipe fitting and the first plug having a second end which is configured to couple to at least one of the plurality of straight components.

Optionally, at least one of the plurality of straight components can have an adjustable length and/or can be extendable and retractable and have a locking mechanism. The kit can also include a second plug. When a second plug is provided, the first plug can have a female end the second plug can have a male end. The plurality of angle components can be angle components having different angles. At least one of the plurality of angle components can have a 90-degree angle and least one other of the plurality of angle components can have a 45-degree angle. At least one of the plurality of straight components is configured to couple to at least one of the plurality of angled components by rotating the straight component about its primary axis to engage the at least one male end into the at least one female end.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention. In the drawings.

DETAILED DESCRIPTION OF THE INVENTION

Embodiments of the present invention relate to a method and apparatus that can be used to construct mock pipe runs to obtain precise measurements and orientations, and layouts such that an actual pipe run can be precisely constructed to precisely replace the mock pipe runs. Most preferably, in one embodiment, a kit can be provided that a pipe fitter can take to a job site. The fitter can reach into the kit and beginning at one end of the desired pipe run can pull out and connect, adjust and/or orientate, and secure individual components until a complete mock run of pipe has been constructed, which has the correct layout and connects to the proper locations at each of its ends. The user can then measure along the constructed mock pipe run and then use those measurements to construct an actual pipe run that replaces the mock pipe run. The term "pipe" as used herein is intended to include not only pipe but also tubing, of any desired cross-sectional shape, and can include pipe and tubing connectors and fittings.

Figure 8A:
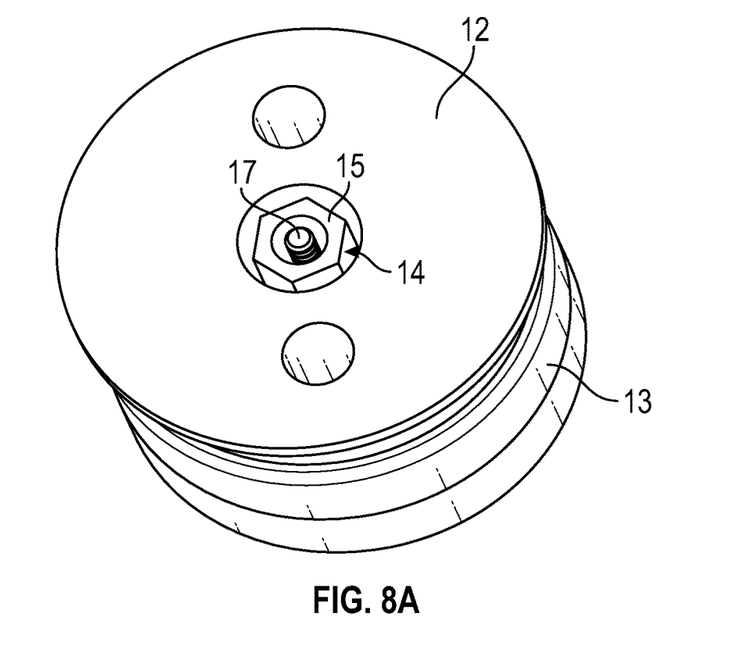
FIGS. 8A and 8B respectively illustrate first and second end plugs that can be used with a field fitter according to an embodiment of the present invention.
Figure 8B:
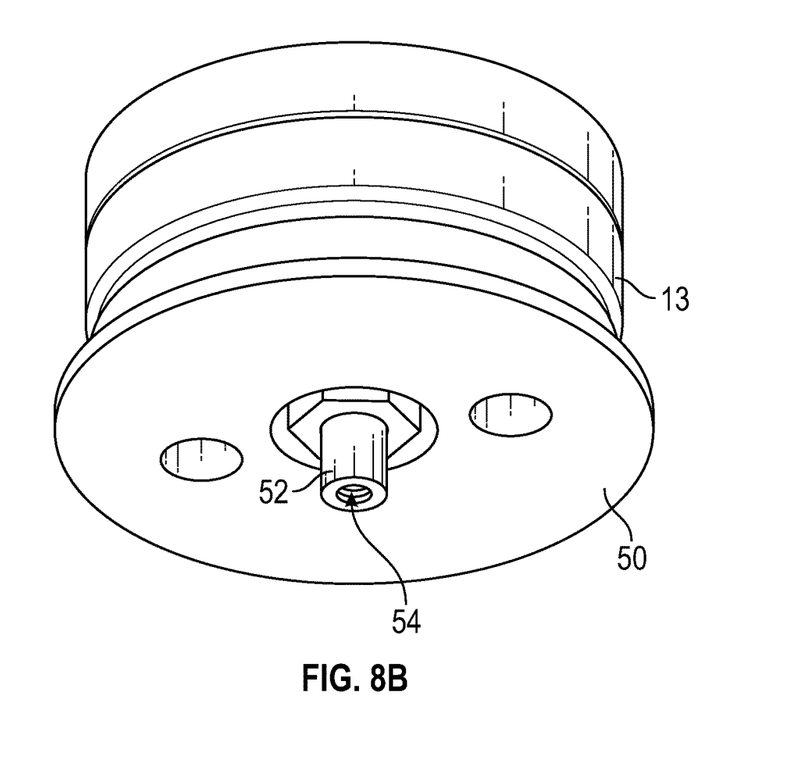

Referring now to the figures, field fitter 10 preferably comprises various parts, which can include first plug end 12 having connector 14 and expansion plug 13 (see FIG. 8B). In use, first plug end 12 is preferably configured such that it comprises external dimensions that are slightly smaller than internal dimensions of an existing pipe or fitting where a mock pipe run is desired to start. First plug end 12 is thus placed into the end of the existing pipe or fitting and manipulated so that it seats snug inside it. This can optionally be done by screwing together front and rear portions of first plug end 12 to compress expansion plug 13. The compression of expansion plug 13 causes expansion plug 13 to be forced outward and thereby engage internal sidewalls of the existing pipe or fitting, thus holding first plug end 12 securely in place.

Figure 1:
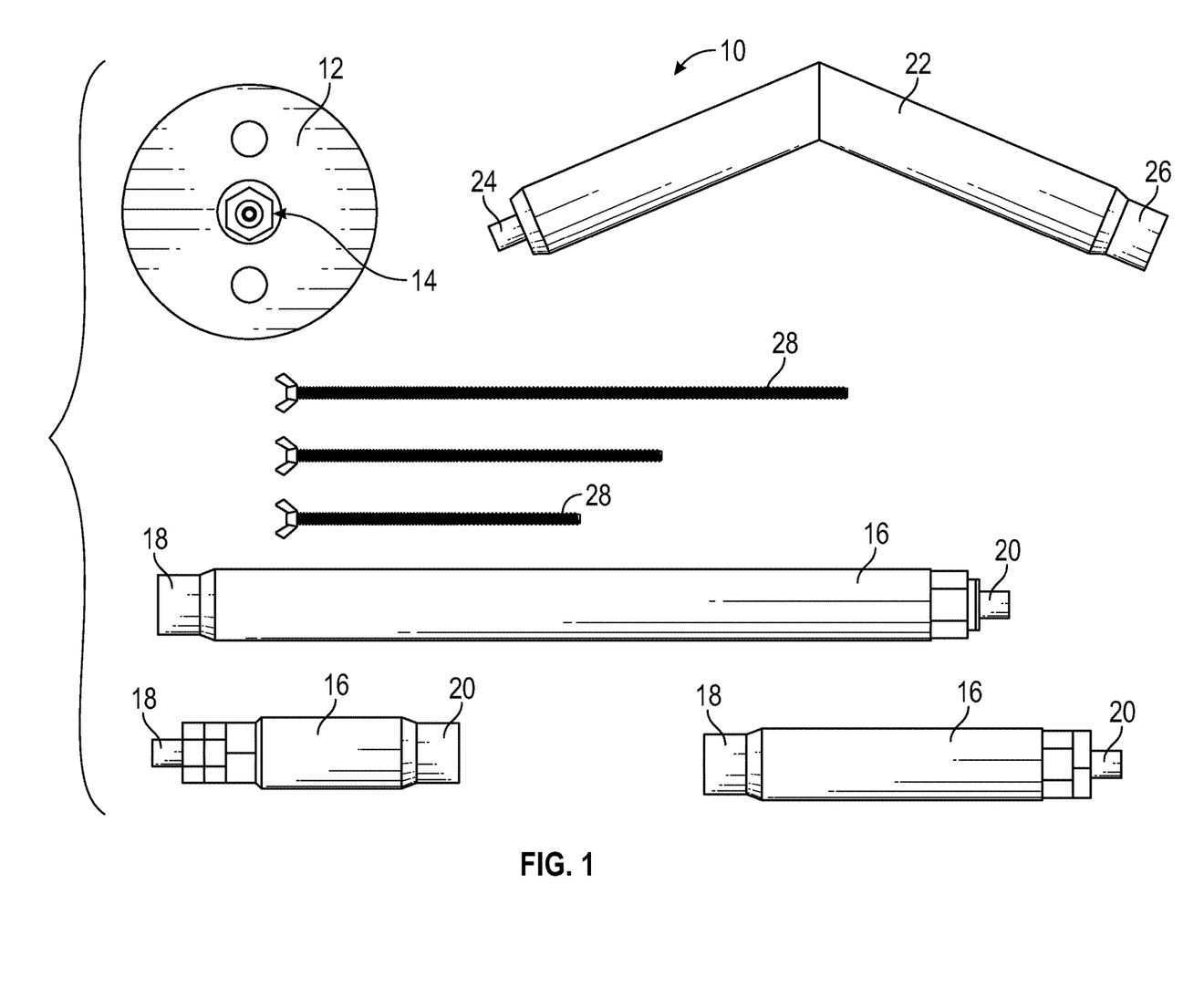
FIG. 1 is a drawing that illustrates a plurality of parts of a field fitter apparatus according to an embodiment of the present invention.
Figure 2:
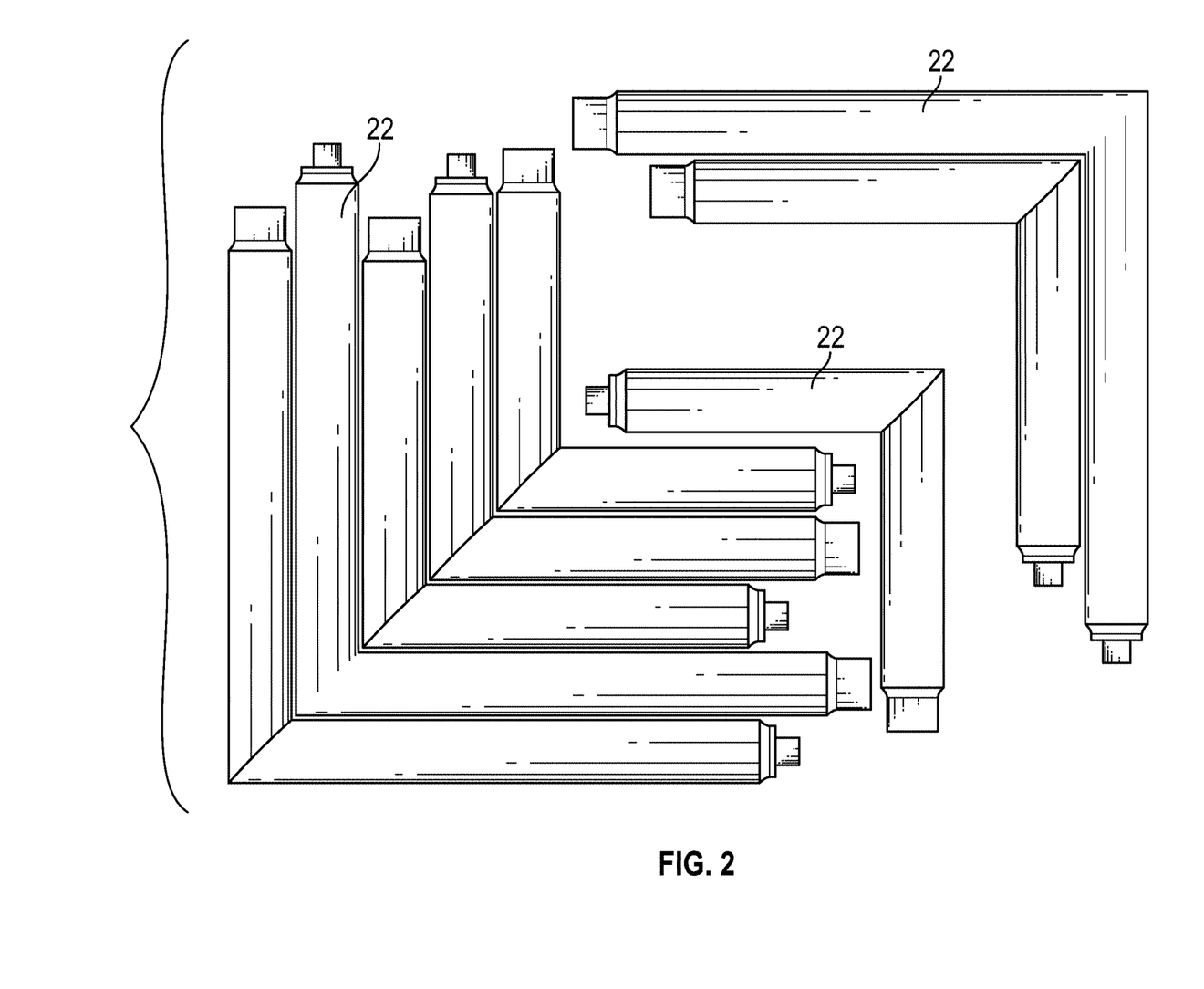
FIG. 2 is a drawing which illustrates several 90-degree angle bends of various sizes that can be used in a field fitter apparatus according to an embodiment of the present invention.
Figure 3:
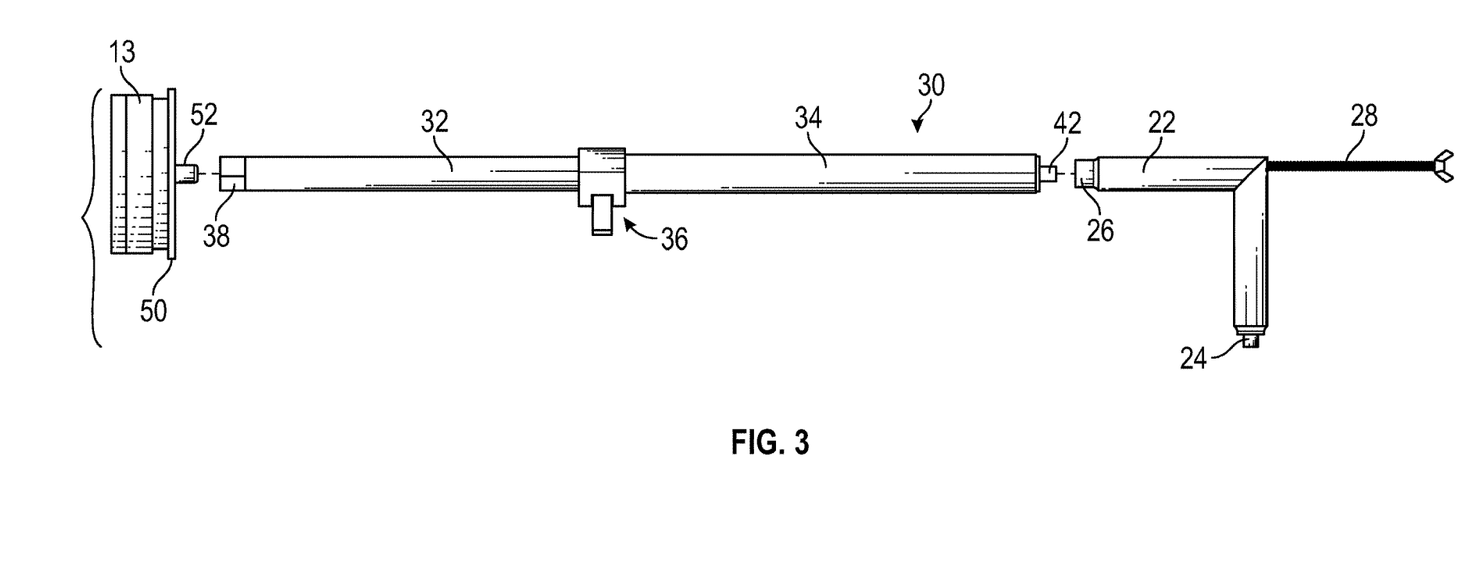
FIG. 3 is an exploded view drawing which illustrates a partially created mock pipe run constructed using a field fitter apparatus of an embodiment of the present invention.
Figure 4:
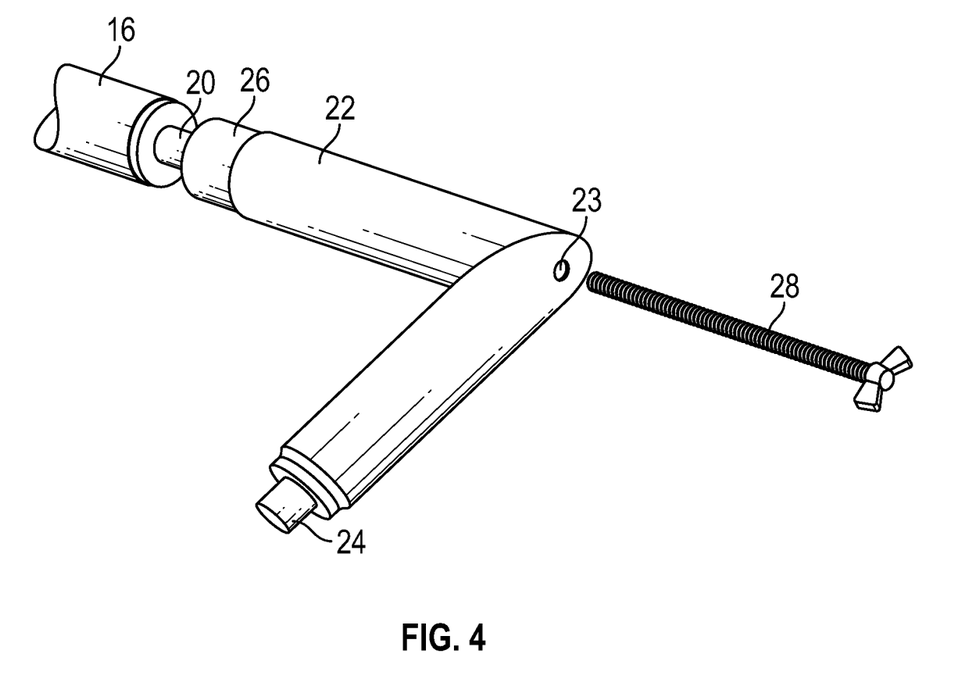
FIG. 4 is a drawing which illustrates a threaded rod being inserted through a hole in a 90-degree angle piece and which is being used to secure a straight segment of a field fitter to the 90-degree angle piece.
Figure 5:
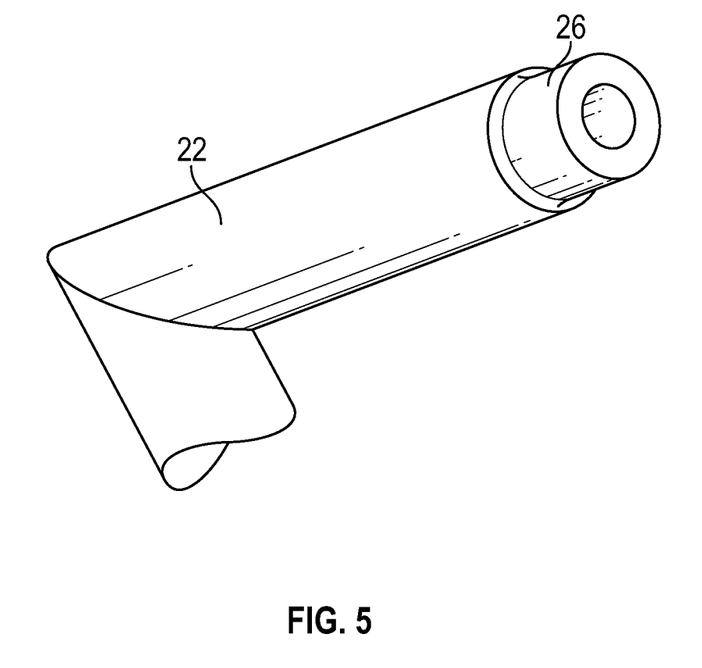
FIG. 5 is a drawing which illustrates an end portion of a 90-degree angle piece—the opening that is visible is the end that an end portion of the threaded rod of FIG. 4 will project into when the threaded rod is fully inserted into the 90-degree angle piece.

With first plug end 12 set, the user can then begin selecting field fitter components to construct the mock pipe run. As best illustrated in FIG. 8A, connector 14 of first plug end 12 preferably comprises female socket 15 having an opening within which is disposed threaded male connector 17. Into female socket 15, a user can optionally insert and rotatably secure a fixed length straight connector 16, having male end 20 and female 18. Field fitter 10 also preferably includes one or more angle connectors 22, which themselves have male end 24 and female end 26. Because angle connectors 22 are preferably able to be positioned to a desired orientation before being secured in place, angle connectors 22 preferably include opening 23 (see FIG. 4) through which threaded rod 28 can pass such that when fully inserted, the end portion of threaded rod 28 resides inside of female end portion 26. Opening 23 is preferably therefore axially aligned with a central portion of female end portion 26.

Instead of, or in addition to, fixed length straight connector 16, in one embodiment, one or more adjustable length connectors 30 can optionally be provided. Adjustable length connectors 30 preferably have smaller diameter tube 34, which can slide into and out of larger diameter tube 32 and which can preferably be locked at any desired length by manipulating cam-lock 36 or any other mechanism which is capable of locking the placement of smaller diameter tube 34 with respect to larger diameter tube 32. Adjustable length connector 30 preferably includes female end 38 and male end 42. Of course, other adjustable length tubes can optionally be used for adjustable length connector 30 as long as the end portions thereof are similar and can thus engage with connectors of other components of field fitter 10. For example, smaller diameter tube 34 can be replaced with a threaded rod and larger diameter tube 32 can be replaced with a tube having internal threads, which the threaded rod can screw in and out to adjust the length of adjustable length connector 30. Optionally, a jam-nut can be provided on the threaded rod of such an adjustable length connector 30.

Figure 6:
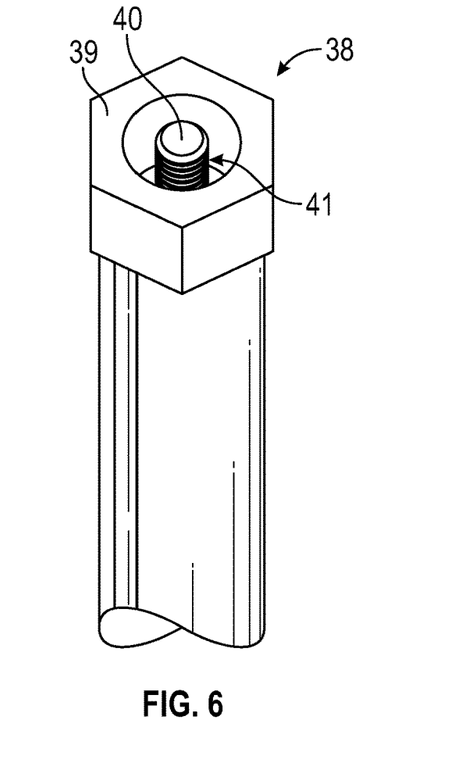
FIGS. 6 and 7 respectively illustrate first and second end portions of an adjustable length straight member according to an embodiment of the present invention.
Figure 7:
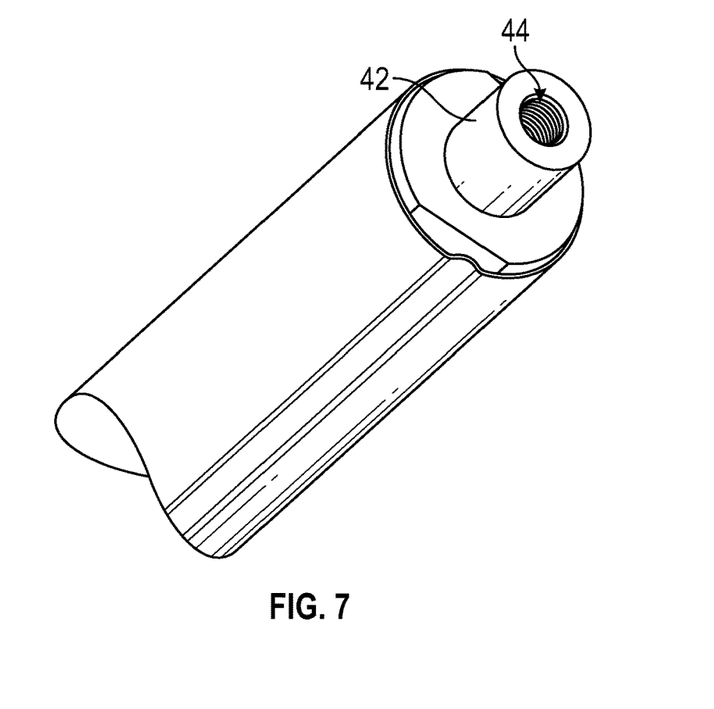

Although fixed length straight connectors 16, adjustable length connectors 30, and/or first and second plug ends 12 and 15 are illustrated in the figures as having different numbers for their respective male or female end portions, structurally, the male ends of those components are preferably all the same, or substantially the same, such that they are interchangeable and the female ends of those components are also preferably all the same, or substantially the same, such that they are all interchangeable. This enables any of the male ends of any of those components to be engaged and secured into the female ends of any other of those components or of a like component (for example, a male end of a fixed length straight connector 16 can be secured into the female end of another fixed length straight connector). FIGS. 6 and 7 illustrate a configuration of such male and female ends. As can be seen, male end 42 of FIG. 7 can be inserted into an opening of female end 38 and the two can be rotated with respect to one another to cause threads 41 of threaded member 40 to engage with threads 44 on an internal surface of male end 42.

Optionally, the exact shape and connection mechanism of male and female ends can be changed from that described and depicted herein and will still produce desirable results and this disclosure is intended to cover any known connecting mechanism. For example, splines and/or interlocking teeth, spring-loaded balls/pins and locking detents, quick connects, and/or a partial twist lock mechanism can be used for the connection of male and female ends.

As best illustrated by observing FIGS. 8A and 8B although the foregoing describes beginning the mock pipe run by installing first plug end 12, a user can optionally instead begin by using second end plug 50, having male end 52, which like the other male ends described herein can include a central opening with threads disposed therein. Still further, although first plug end 12 is described as preferably connecting to an existing pipe or fitting via a compression plug, any other structure or mechanism can be used which is capable of disposing connector 14 at or near a central portion of an existing pipe or fitting or of otherwise disposing connector 14 at a desired starting location for a pipe run.

Although angle connectors 22 are illustrated as being right angle connectors, any angle can be provided. In one embodiment, field fitter 10 can comprise several angle connectors of various angles, including but not limited to for example, about 90 degrees, about 45 degrees, about 30, and/or about 60 degrees. Optionally, in one embodiment, angle connector 22 can be angularly adjustable such that it can be rotated to a desired angle and locked into place. Because pipe runs are typically dimensioned from a center of a pipe, in one embodiment, connectors on end plugs are preferably disposed at or about the center of the plug such that the resulting mock pipe run is constructed along the centerline of the pipe run that is to be constructed and such that the beginning and end of the mock pipe run begins and ends at or about a centerline of a desired beginning and end of the mock pipe run—for example at or about the center of existing pipes and/or connectors.

Although the various components are most preferably coupled by attaching a male end of one component to a female end of another component, in one embodiment, the various components can comprise the same end configurations and the various components can instead be connected to one another by use of couplers that join the like ends. In this embodiment, the ends of the components and the shape of the couplers can be any desired configuration so long as the couplers are configured to engage with the ends of the components to provide a secure connection between the components. For example, in one embodiment, the ends of all components can be male ends and the couplers can comprise a female ends such that a male end of the first component can couple to the first female end of the coupler and second female end of the coupler can couple to a male end of a second component—the converse can also provide desirable results—namely with the components having female ends and the couplers comprising male ends.

Figure 9:
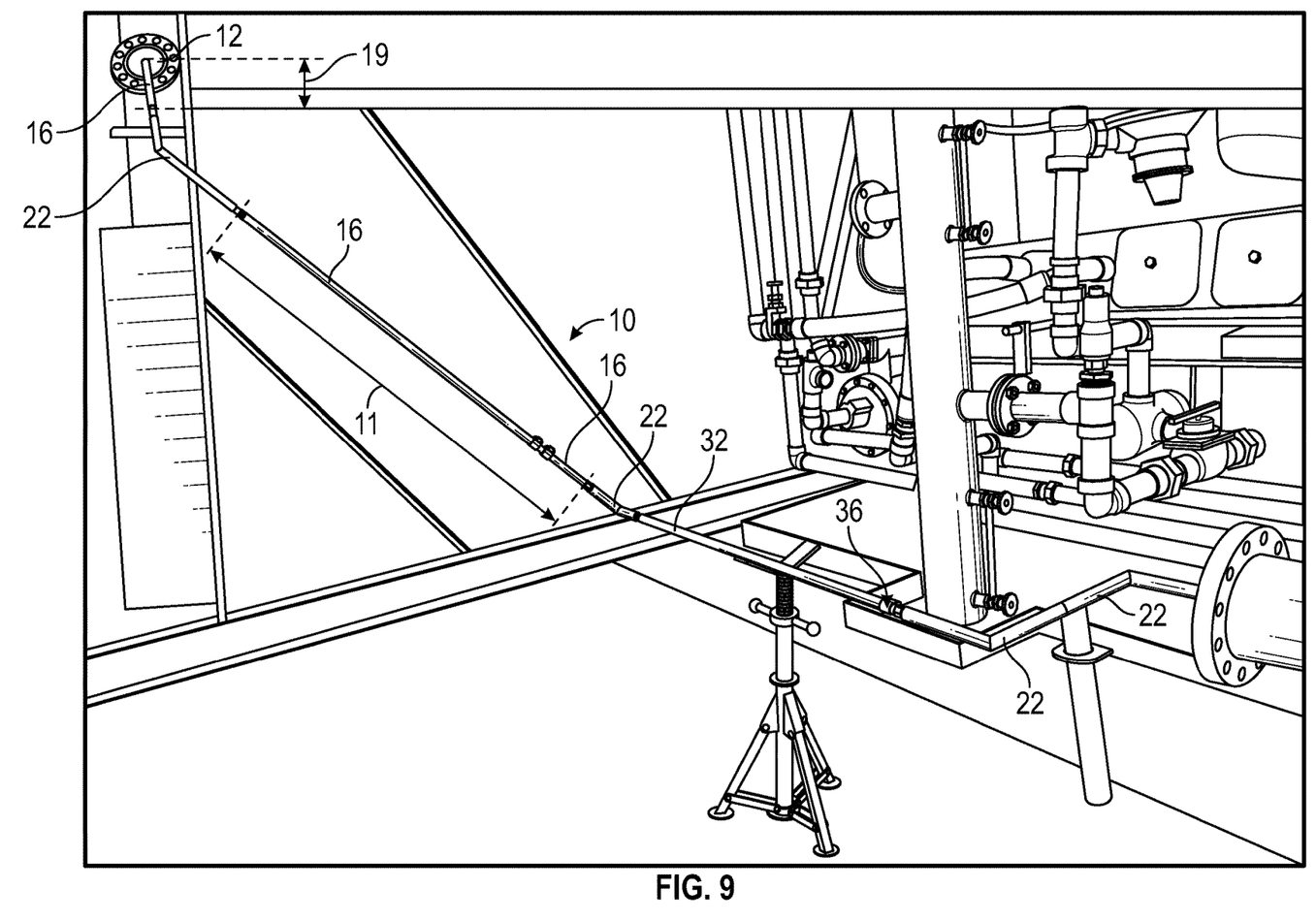
FIG. 9 is a drawing which illustrates a mock pipe run using a field fitter that has been constructed to connect ends of existing pipe on a piece of equipment according to an embodiment of the present invention.

In order to obtain the proper measurements to construct the pipe run to replace the mock pipe run, in one embodiment, straight connectors are preferably measured from one end to the other to obtain the proper cut length for the pipe that will replace them as best illustrated as reference number 11 in FIG. 9. If the first segment is a straight segment, measurements are preferably taken from a face of first end plug 12, to a threaded joint connection of a connector 22 (see reference number 19 in FIG. 9). Measurements can also be obtained from face of first end plug 12 to an end of connector 22. If measurements are taken from a first end plug 12 to a threaded joint flange dimensions are preferably subtracted from the measurement to obtain the correct length. When measurements are taken from first end plug 12 to an end of connector 22 (for example an outside corner end of connector 22), the user preferably subtracts both the thickness of the flange and the fitting dimensions.

In one embodiment, angle connectors 22 can comprise a length or markings which represent an actual length or one or more dimensions of a length of an angled pipe fitting. For example, a 90 or 45 degree fitting preferably comprises a length which is equal to a standardized length of a pipe 90 or 45 degree fitting—optionally the length of the fitting can comprise a length as described in "Pipefitters Blue Book", by W. V. Graves. In one embodiment, angle connectors 22 can comprise markings on them which represent the correct fitting size for a desired pipe connector.

Note that in the specification and claims, "about", "approximately", and/or "substantially" means within twenty percent (20%) of the amount, value, or condition given.

Embodiments of the present invention can include every combination of features that are disclosed herein independently from each other. Although the invention has been described in detail with particular reference to the disclosed embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference. Unless specifically stated as being "essential" above, none of the various components or the interrelationship thereof are essential to the operation of the invention. Rather, desirable results can be achieved by substituting various components and/or reconfiguring their relationships with one another.

What is claimed is:

1. A method for fitting pipe comprising:
constructing a mock run of pipe by connecting a plurality of components together from a desired starting location for a pipe run to a desired ending location, wherein constructing a mock run of pipe includes adjusting a length of an extendable and retractable straight component;
taking measurements of the constructed mock run of pipe;
constructing a pipe run based on the taken measurements; and
replacing the mock run of pipe with the constructed pipe run.

2. The method of claim 1 wherein constructing a mock run of pipe comprises selecting the plurality of components from a kit.

3. The method of claim 1 wherein constructing a mock run of pipe comprises connecting at least one angle component to the extendable and retractable straight component.

4. The method of claim 1 wherein constructing a pipe run comprises welding.

5. The method of claim 4 wherein welding comprises welding at least one angled pipe fitting to at least one pipe.

6. The method of claim 4 wherein constructing a pipe run comprises cutting a pipe to a desired length.

7. The method of claim 1 wherein constructing a mock run of pipe comprises disposing a plug within a desired starting or ending location of the mock run of pipe.

8. The method of claim 1 wherein constructing a mock run of pipe comprises inserting a male end of a first component into a female end of a second component.

9. The method of claim 1 wherein constructing a mock run of pipe comprises screwing a first component onto a second component.

10. The method of claim 1 wherein constructing a mock run of pipe comprises inserting a straight component into an angled component and securing the straight component to the angled component by passing a threaded fastener through at least a portion of the angled component, screwing the threaded fastener into an end portion of the straight component.

11. The method of claim 1 wherein constructing a mock run of pipe comprises positioning the mock pipe run into a desired configuration such that the mock run of pipe extends from a first end to a second end in an orientation that is desired of the constructed pipe run.

12. A mock pipe run kit comprising:
- a plurality of straight components, each of said plurality of straight components comprising at least one male end;
- at least one of said plurality of straight components is extendable and retractable and comprises a locking mechanism;
- a plurality of angle components, each of said plurality of angle components comprising at least one female end, wherein said at least one male end is configured to couple to said at least one female end; and
- a first plug, said first plug comprising a first end which is configured to secure within an end of a pipe or an end of a pipe fitting and said first plug comprising a second end which is configured to couple to at least one of said plurality of straight components.

13. The mock pipe run kit of claim 12 wherein at least one of said plurality of straight components comprises an adjustable length.

14. The mock pipe run kit of claim 12 further comprising a second plug.

15. The mock pipe run kit of claim 14 wherein said first plug comprises a female end and wherein said second plug comprises a male end.

16. The mock pipe run kit of claim 12 wherein said plurality of angle components comprise angle components comprising different angles.

17. The mock pipe run kit of claim 12 wherein at least one of said plurality of angle components comprises a 90-degree angle and wherein at least one other of said plurality of angle components comprises a 45-degree angle.

18. The mock pipe run kit of claim 12 wherein at least one of said plurality of straight components is configured to couple to at least one of said plurality of angled components by rotating the straight component about its primary axis to engage the at least one male end into the at least one female end.

* * * * *